Nov. 25, 1958  A. H. LUNDIUS  2,861,399
FEED CONTROL MECHANISM
Filed Jan. 27, 1956  2 Sheets-Sheet 1
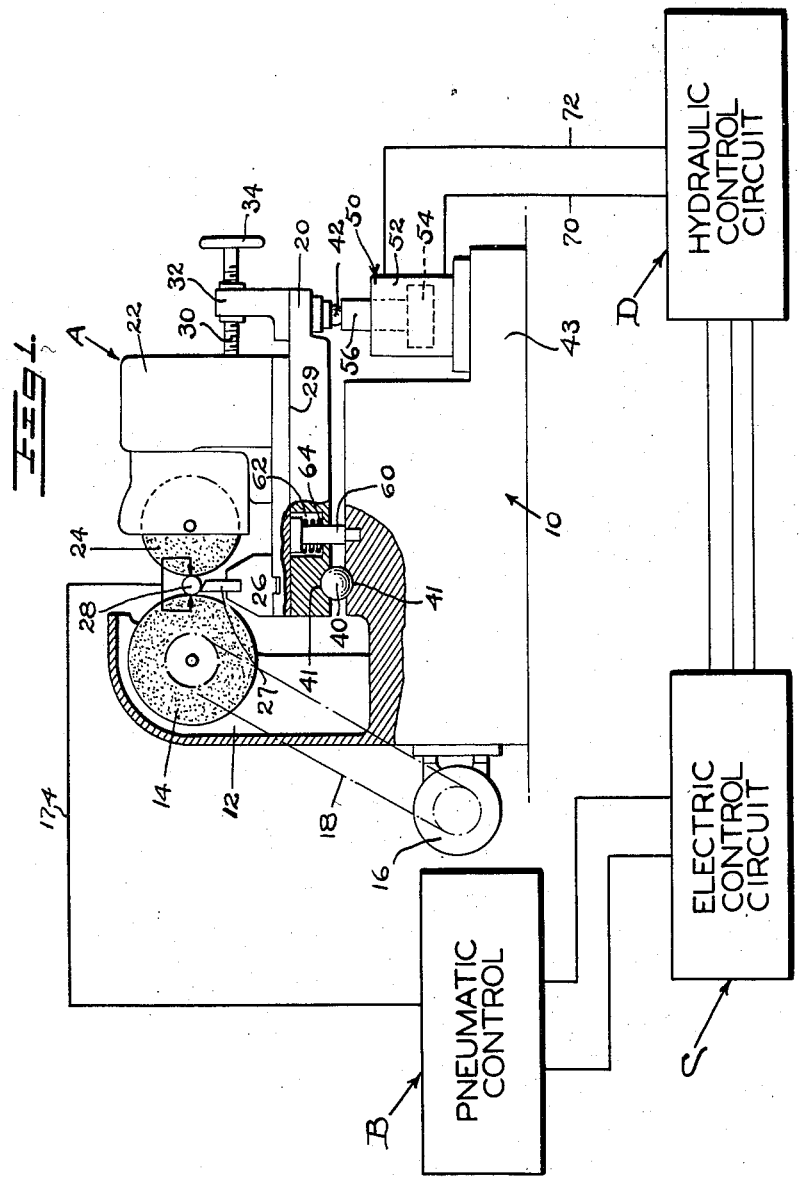
INVENTOR
ALTON H. LUNDIUS
BY Edward H. Goodrich
HIS ATTORNEY

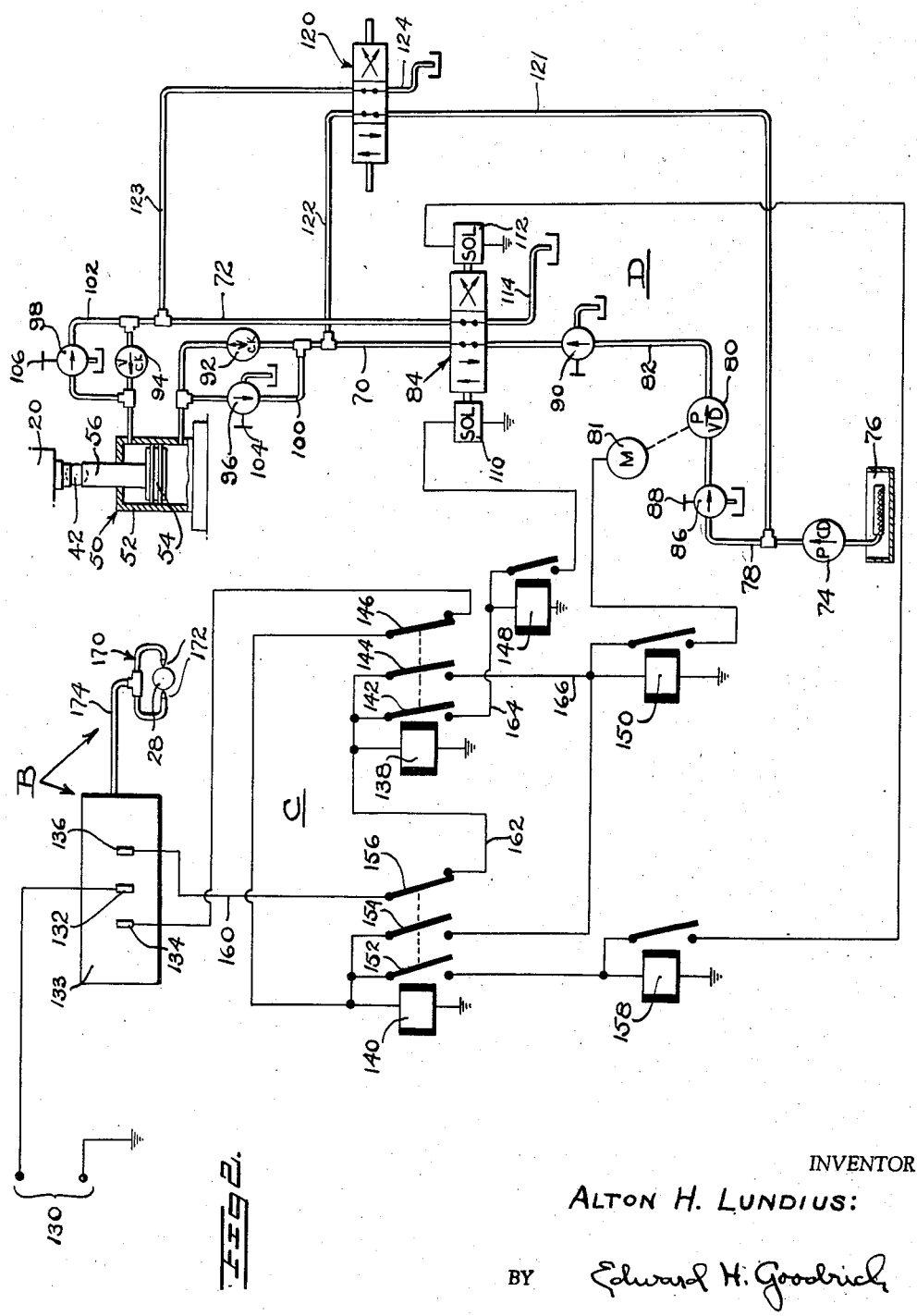

United States Patent Office 2,861,399
Patented Nov. 25, 1958

2,861,399

FEED CONTROL MECHANISM

Alton H. Lundius, East Orange, N. J., assignor to General Motors Corporation, Detroit, Mich., a corporation of Delaware Application January 27, 1956, Serial No. 561,783

10 Claims. (Cl. 51—103)

The present invention relates to a novel type of machine tool feed mechanism. The mechanism, while applicable to many types of machine tools, is particularly adapted for and will be described in relation to its use with a centerless grinder. The present mechanism includes a plurality of feed control devices, one for providing a coarse feed and another for providing a fine feed of the work piece in relation to a cutting or grinding surface.

This invention broadly comprehends a novel fine feed mechanism, an automatic control system for the fine feed mechanism and the unique combination of the fine feed mechanism with a coarse feed mechanism. While not necessarily so limited, the present invention is illustrated with a machine in which the feed mechanisms are adapted to move the work piece in relation to a cutting or grinding tool in order to vary the amount of cut desired. Suffice it to say that this invention is equally applicable to a machine in which the feed is varied by moving the cutting tool relative to the work piece.

In most machine tools, and particularly in centerless grinders, serious difficulties are encountered in trying to establish and hold size tolerances within a ten-thousandth of an inch. This has been due to the cumulative effect of the backlash or looseness of each of the several component parts in conventional feed control mechanisms. For instance, most machine tool feed mechanisms include a dovetail feed slide and corresponding ways, a feed screw and follower nut, and a worm and gear reduction, while in many cases a plurality of each of these submechanisms are utilized. Backlash is invariably present between the feed screw and follower nut as well as in the worm and gear reduction. Further, feed screw shafts inevitably have some torsional windup, while a dovetail slide may stick in the ways. Accordingly, in conventional feed control mechanisms when the feed is incrementally adjusted, manually or automatically, backlash, windup and friction accumulate to absorb enough of the incremental feed adjustment to preclude very close tolerance control as is commonly desired in precision grinding operations.

Thus, the present invention provides a novel and essentially simple type of mechanism which enables the precise control of feed in increments of a tenth, or fraction of a tenth, of a thousandth of an inch and which, in addition to centerless grinders, may be applied to other machines where sensitive and accurate feed control is requisite. Automatic internal grinders, end grinders and the like are examples.

Heretofore, feed control, particularly in a centerless grinder, has been achieved by moving some part of the feed mechanism linearly with respect to the surface to be cut. It is an object of the present invention to move the feed determining element arcuately about the cutting surface in order to achieve an exceedingly fine feed control. This concept of arcuate feed, as well as the mechanism and control system therefor, constitutes the basis of the present invention.

It is also an object of the present invention to provide a feed control mechanism in which means is provided for moving the feed control element linearly relative to the cutting surface to achieve a coarse feed control, in combination with the aforesaid arcuate movement of the feed control element to provide fine feed control.

The present invention also provides a system for automatically controlling the fine feed control device in accordance with the size of the work piece. This system includes a gauge for continuously testing the work piece and which gauge in turn automatically actuates an electrical hydraulic system for accurately controlling the fine feed mechanism to correct for the over or under size of the work piece within the tolerances already suggested.

Still other objects will be apparent from a perusal of the detail description which follows.

In the drawings:

Figure 1 diagrammatically illustrates one form of feed control mechanism embodied in a centerless grinder, and having a pneumatic-electric-hydraulic control system.

Figure 2 discloses a detailed representation of the automatic fine feed control system.

Referring to Figure 1, A generally indicates a centerless grinding machine, B a pneumatic control, C an electrical control system, and D an hydraulic control system.

The centerless grinder A includes a support bed 10 upon which is mounted a grinding wheel support structure 12, a rotatably driven grinding wheel 14, an electric motor 16, and a power transmitting belt 18 drivingly connecting said motor to said grinding wheel. Also pivotally mounted upon the bed 10 is a base 20. Mounted on the base 20 is a regulating wheel support structure 22 and a regulating wheel 24 rotatably disposed in the support structure 22. Also disposed on the base 20, intermediate the grinding and regulating wheels, is a workholder 26 having a work supporting shoe 27 adapted in combination with regulating wheel 24 to support and rotatably drive a work piece 28 in engagement with the grinding wheel 14. Insofar as the present invention is concerned, the grinding wheel, regulating wheel and work holder are of conventional design, and, therefore, will not be specified in any greater detail.

The regulating wheel supporting structure 22 is mounted on the base 20 through a slide 29 and is arranged for linear feed with respect to the base 20 and grinding wheel 14 through a feed screw 30 supported within a bracket 32 rigidly fixed to this base. The feed screw is controlled by a hand wheel 34 and provides a coarse feed of the regulating wheel 24, shoe 27 and work piece 28 relative to the grinding wheel 14. Through the linear feed control device, a coarse feed control is achieved which will enable the regulating wheel to be moved in or out relative to the grinding wheel in relatively large increments where resort to the fine control mechanism is unnecessary.

It will be observed in Figure 1 that the base member 20 is supported on the bed 10 and spaced therefrom by a pair of spaced bearing members 40 and a bearing member 42 in such a way as to permit relative arcuate movement of the base 20 with respect to the bed 10.

More specifically, the bearing members 40 comprise a pair of ball pivot elements, only one of which can be seen, while bearing 42 is a ball or roller element. Mounted between the bearing element 42 and a depressed portion 43 of the bed 10 is a large servo motor 50 which includes a cylinder 52, piston 54 and a piston rod or extension 56. The bearing members or ball pivots 40 are matingly seated within opposed parti-spherical seats 41 in the bed 20 and in the base 10. Similarly, the round bearing member 42 is received by opposed seats on the base 20 and in the top of the piston extension 56. This interfitting relation of the pivotal members within their respective seats avoids any lost longitudinal motion between the base 20 and bed 10 and provides a precisely controlled arcuate feed of the base 20 on the ball pivots under control of the movement of the piston 54. Since the ball pivots 40 are located beneath the work piece 28 through a considerably lesser distance than the distance between the axes of the ball pivots and the bearing member 42, it will be appreciated that a short vertical movement of the piston 54 results in a very small feed of the work piece with respect to the grinding wheel 14. In the illustrated embodiment, a vertical travel of one ten thousandth of an inch of the piston 54 results in a feed of one quarter of one ten thousandth of an inch of the work piece 28 with respect to the grinding wheel. This arrangement provides a precision fine feed control mechanism which eliminates the use of dovetail slides, gears and feed screws with their consequent objectionable lost motion connections.

In order to maintain a constant pressure between the base 20 and the bed 10 and prevent any looseness or lash in the fine feed system, a headed stud 60 extends into a counterbore 62 in the base 20 and is threaded or otherwise anchored to the bed 10. Intermediate the head of the stud 60 and the bottom of the counterbore 62, there is disposed a heavy spring 64 which secures the base against the pivotal bearing supports 40—42, and in turn against the bed 10. It is important to note that the only location where looseness or lash might be introduced into the fine feed mechanism is at the spherical surfaces where bearings 40 contact bed 10 and base 20, as well as where bearing 42 contacts base 20 and piston rod 56. It is a relatively simple matter to control the sphericity of these bearing seats and surfaces well within tolerances which will permit the precise fine feed control within the extremely close tolerances required.

Hydraulic control system

In order to control its movement, conduits 70 and 72 are connected to cylinder 52 on opposite sides of the servo piston 54. Thus to move the piston upwardly and increase the cut on the work piece, fluid is supplied through conduit 70 to the underside of the piston 54. To move the piston downwardly, fluid is supplied to the upper side of the piston through conduit 72. To provide the control fluid, a small volume constant displacement gear pump 74 continuously supplies liquid from a sump 76 to a conduit 78 leading to a variable stroke piston-type metering pump 80 which in turn feeds through conduit 82 to an automatically controlled servo control valve 84. A pressure regulator valve 86 is provided and is set through a control mechanism 88 to supply fluid at a predetermined suitable pressure, such as 50 p. s. i., the conduit 78. To control the pressure in line 82, another pressure regulator, or safety valve 90 is set for a predetermined suitable pressure such as 100 p. s. i. Check valves 92 and 94 are provided in conduits 70 and 72 to prevent unscheduled reverse flow of fluid therethrough.

To achieve minute incremental movement of servo piston 54 in the order of one ten thousandth of an inch or less, pump 80 must be adapted to meter small quantities of fluid. To meter in small quantities, pump 80 may, for example, have a small bore and a short stroke which is variable. A reduction gear motor 81 powers pump 80 and this pump will continue to run and meter a very small volume of liquid for each stroke to piston 54 as long as the gauging system indicates a need for feed variation.

When it is desired to move the piston 54, fluid is supplied either to conduit 70 or 72. However, when fluid is so supplied, the non-feeding conduit must be opened to exhaust to permit piston movement. In order to control the pressure against which the piston 54 is working, back pressure relief valves 96 and 98 are respectively provided in the conduits 100 and 102, which serve as bypasses around the check valves 92 and 94. The back pressure level of valves 96 and 98 may be controlled through suitable mechanism 104 and 106. To illustrate the operation of the back pressure valves, assume feed line 72 is open to exhaust through the automatic control valve 98, the ball check 94 will be closed and fluid in the cylinder 52 above the piston 54 will exhaust through the valve 98 to precisely control the rate of piston movement and consequent rate of feed of the work piece 28 thus providing a very sensitive control of the movement of the piston.

The automatic servo or reversing valve 84, as diagrammatically shown in Figure 2, is under the control of reversing solenoids 110 and 112, which shift the valve 84 to the left or right positions. The arrows at the left and right ends of the valve indicate which of the conduits, 70 or 72, will be connected to feed pressure and which to exhaust when the valve is moved to the left or right by these solenoids. The conduit 114 leading from control valve 84 feeds to exhaust. Assuming actuation of the solenoid 110 to cause the feed of the regulating wheel toward the grinding wheel, the valve 84 will be moved to connect the pressure supply conduit 82 with the piston feed conduit 70 delivering fluid under pressure into the cylinder 52 beneath the piston. At this time, conduit 72 is connected to passage 114 communicating to exhaust fluid in the cylinder from above the piston 54 at a controlled rate through the back pressure regulating valve 98. Upon actuation of the solenoid 112, the control valve 84 is shifted to its reversed position connecting conduit 82 to feed passage 72 and conduit 70 to exhaust, the fluid flowing from beneath the piston at a controlled rate through the valve 96.

When it is desired to place the fine feed control mechanism under manual control, a manually operated servo valve 120 is used. The valve 120 generally corresponds to the reversing valve 84 and functions in the same manner but under manual control. This valve 120 is parallel connected in the hydraulic circuit with respect to metering pump 80 and solenoid valve 84 so that the output of pump 74 may be fed directly through a conduit 121 to the valve 120 and thence selectively through conduits 122 or 123 to the conduits 70 or 72 to actuate piston 54, exhaust being effected through one of these conduits and a conduit 124 connected to the valve 120.

The automatic and manual control valves 84 and 120 have mechanical interlocking connection so that one valve is located in a neutral non-feeding position while the other valve is being used to control fluid feed to and from the cylinder 52.

Electrical control system

The electrical control system C operates the valve 84 in response to the gauged size of the work piece 28. A power line 130 has one side grounded and has its other side connected to the mid contact 132 of a switch 133. High and low tolerance contacts 134 and 136, adapted to control over and under feed, are proximately disposed on either side of the contact 132. In accordance with the need to decrease or increase feed, the pneumatic control B is adapted to cause either contact 134 or 136 to be engaged by contact 132.

Triple switch relays 138 and 140 are disposed respectively in the "up-feed" and "down-feed" circuits and when alternatively actuated, energize either the "up-feed" solenoid 110 or the "down-feed" solenoid 112 and, in either instance, energize the metering pump motor 81.

Relay 138 includes switches 142, 144 and 146, respectively, connected in series with an up solenoid relay 148, a relay 150 for motor 81 and relay 140. With relay 138 deenergized, as shown, switches 142 and 144 are biased open and switch 146 is closed.

Relay 140 generally corresponds to the relay 138 and includes switches 152, 154 and 156, respectively, connected in series with a down solenoid relay 158, motor relay 150 and relay 138. With relay 140 deenergized, as shown, switches 152 and 154 are biased open and switch 156 closed.

In operation, the closing of contacts 132 and 136, to increase the feed in response to an oversize indication from the gauge, causes current to flow through line 160, switch 156 and line 162 to energize relay 138. Energization of relay 138 closes switches 142 and 144 while opening switch 146. Switches 142 and 144 respectively permit current to flow in lines 164 and 166 energizing the up solenoid relay 148 and motor relay 150. Solenoid 110 accordingly shifts valve 84 so as to feed metered quantities of fluid through conduit 70 to the underside of piston 54 thereby feeding work piece 28 into the grinding wheel 14 at a predetermined measured rate of fine feed. The opening of switch 146 is a safety precaution which prevents the accidental energization of the down-feed control circuit at the same time the up-feed circuit is operating.

Inasmuch as the corresponding down-feed circuit elements function in the same manner to energize the down solenoid 112 upon closing contacts 132 and 134, it is deemed to be unnecessary to recite the detailed operation of this circuit.

It is understood that the aforedescribed electrical control circuit is merely illustrative of a variety of circuits, including electronic, which might be so utilized to control the valve 84.

*Pneumatic control*

To actuate the high and low tolerance contacts 136 and 134, a pneumatic gauging mechanism 170 is provided. While the use of various types of gauging devices is possible, the pneumatic gauge 170 has been found to be very satisfactory. Gauge 170 includes a pair of air jets 172 adapted to diametrically feed air under controlled pressure to the work piece 28 on opposite sides thereof. As is conventional in gauges of this general type, if the work piece is under-sized, a large quantity of air will leak between the work piece 28 and the nozzles 172 resulting in a large pressure drop in an air supply line 174. The pressure drop will then through any suitable device, such as a diaphragm controlled mechanism not shown, actuate the low tolerance contact 134 causing the electrical and hydraulic control systems to move the servo piston 54 downwardly, as already described, to increase the radial distance between the grinding and regulating wheels 14 and 24 thereby decreasing the cut on the work piece.

Assuming the work piece to be oversize, only a small quantity of air will be able to leak between the work piece and the nozzles and this will result in a build-up of pressure in the supply conduit 174 causing the high tolerance contact 136 to be engaged with power contact 132 and moving the servo piston upwardly increasing the amount of cut. By this means automatic size control is maintained and, because of the subject unique fine feed control mechanism, is held within tolerances heretofore unobtainable.

In order that gauge 170 may be utilized with various size work pieces, the nozzles 172 may be of a type which are adjustable relative to the required size.

*General operation*

To recapitulate the general operation of the subject control mechanism, it may be seen that the linear feed control mechanism 30—34 may be actuated to rapidly move the work piece into its approximate radial position with respect to the grinding wheel at which position the fine feed is to reduce the work piece to the precisely required size. Thereafter the fine feed control may be automatically maintained through the pneumatic-electrical-hydraulic control system as already described.

Where it is desired to utilize the manually controlled fine feed, as might be done where a single or small number of work pieces is involved, the manual control valve 120 may be employed.

It is to be understood that variations in the above mechanisms and control systems are comprehended within the teaching of the subject invention.

I claim:

1. A grinding machine comprising a rotatably driven grinding member for grinding a work piece to a predetermined size, a work piece rotating member, a work piece supporting member, a feeding mechanism for varying the distance between the grinding member and said rotating member, said mechanism including a coarse feeding mechanism and a fine feeding mechanism, the coarse feeding mechanism including a support slidably movable to regulate the radial distance between said grinding wheel and the work piece rotating member, the fine feeding mechanism being independent of said coarse feeding mechanism and providing a simultaneous arcuate feed of the work piece supporting member and of the work piece rotating member while maintaining said members in a fixed spaced relation to each other, and a gauge responsive to a change in work piece size during grinding and controlling the fine feed mechanism, said gauge being located out of work piece engagement during grinding.

2. A grinding machine comprising a rotatable grinding wheel and a rotatable regulating wheel in lateral spaced relation for simultaneous engagement with a rotatable work piece therebetween, a work supporting member between the wheels for locating the work piece, mechanism to rotate the regulating wheel in driving engagement with the work piece, mechanism to rotate the grinding wheel in grinding engagement with the work piece, a base pivotally mounted beneath said wheels for tiltable movement towards and from one of said wheels, a feeding mechanism pivotally connected to the base for arcuately swinging the base through a precisely controlled extent to predetermined positions, and one of said wheels and said work support member being secured in fixed relation to each other on said base for simultaneous arcuate feeding movements about the same axis under control of the feeding mechanism.

3. A grinding machine comprising a rotatable grinding wheel and a rotatable regulating wheel in lateral spaced relation for simultaneous engagement with a rotatable work piece therebetween, a work support member between the wheels to locate the work piece in grinding position, driving mechanism for both wheels, a base pivotally mounted at one end beneath both of said wheels for tiltable feeding movement towards and from the grinding wheel, fluid pressure operated feeding mechanism including a piston, means pivotally connecting said piston to the other end of the base for tiltably positioning the base through a precisely required extent, the regulating wheel and the work support being carried by the base in fixed relation to each other for simultaneous arcuate movement with the base, and gauging mechanism responsive to work piece size during grinding for controlling the extent of feeding movement of said feeding mechanism, said gauging mechanism being located out of contact with the work piece during the gauging of said work piece.

4. A grinding machine comprising a rotatable grinding wheel and a rotatable regulating wheel in lateral spaced relation to each other for simultaneous engagement with a rotatable work piece therebetween, driving mechanism for both wheels, the regulating wheel rotatably driving the work piece during a grinding operation on the work piece by the grinding wheel, a base mounted on ball pivots beneath both of said wheels for a tiltable feeding movement towards and from the grinding wheel, a support slidably mounted on the base for linear slidable adjustment towards and from the grinding wheel, the regulating wheel and the work supporting member being mounted on said support in fixed relation to each other, feeding mechanism to adjustably position the support on the base to locate the work piece for grinding, and a second feeding mechanism pivotally connected to the base and independent of the other feeding mechanism for tilting the base through precisely measured extents to accurately regulate the extent of grinding upon the work piece.

5. A grinding machine comprising a rotatable grinding wheel and a rotatable regulating wheel in spaced relation for simultaneous engagement with a rotatable work piece therebetween, a work supporting member between the wheels for locating the work piece, driving mechanism for both wheels, the regulating wheel frictionally engaging and rotating the work piece during a grinding operation thereon by the grinding wheel, a base mounted on ball pivots at one end beneath both of said wheels for tiltable feeding movement towards and from the grinding wheel, a support slidably mounted on the base for movement towards and from the grinding wheel, the regulating wheel and the work support member being mounted in fixed relation to each other on said support, manually controlled feeding mechanism for adjustably positioning the support on the base, a second feeding mechanism independent of said first mentioned feeding mechanism and pivotally connected to the base through a ball pivot for tilting the base through precisely controlled extents to regulate a grinding operation, and a gauge responsive to the size of the work piece during grinding and controlling the feeding movement of said second feeding mechanism.

6. A centerless grinding machine comprising a grinding wheel, a regulating wheel radially spaced from the grinding wheel, a work positioning blade for supporting a work piece between said wheels during a grinding operation on the work piece, a supporting bed for the grinding wheel, a base, a plurality of ball pivots tiltably supporting the base on the bed, means supporting said blade and the regulating wheel in fixed relation to each other on the base, a coarse feed mechanism providing simultaneous rectilinear movement of the blade and regulating wheel with respect to the base, a fine feed mechanism connected to tiltably position the base and the blade and said regulating wheel simultaneously with respect to the bed and including a servomotor having a piston supporting the base, a ball pivot between the piston and said base, an hydraulic system supplying metered quantities of fluid to the servomotor, an electrical system controlling of the hydraulic system, and a fluid pressure actuated gauge responsive to the size of a work piece through the flow of fluid against the work piece during grinding and controlling said electrical system.

7. A feed control mechanism for regulating the grinding of a work piece comprising a servo motor having a movable piston member, an hydraulic system for actuating said motor and including a variable displacement metering pump, a multi-position valve intermediate said motor and said pump to selectively direct fluid to the motor and selectively control the direction of piston movement, solenoids controlling the valve, a first electrical switching mechanism adapted to control a shifting of said valve to one fluid transferring position to effect a controlled piston feed in one direction, a second electrical switching mechanism adapted to control a shifting of said valve to another fluid transferring position to effect a controlled piston feed in an opposite direction, each of said switching mechanisms including separate means when energized for rendering the other relay inoperative and for actuating said pump, and a gauge for selectively actuating said switching mechanisms in accordance with the size of a work piece, said gauge being located out of contact with the work piece and responding to a flow of fluid under pressure against the work piece.

8. A machine as defined in claim 1 in which said second device comprises an hydraulically actuated servo motor having a piston pivotally connected to the support member, a pump member for supplying fluid in measured amounts under pressure to the servo motor, a multi-position solenoid-controlled valve adapted to direct fluid under pressure to a preselected side of the servo piston, switching mechanism controlling the actuation of said valve and said pump, and mechanism responsive to the gauge controlling said switching mechanism.

9. A centerless grinder as defined in claim 2 in which said arcuate translating means includes a servo motor having a piston member, an hydraulic system for actuating said member, said system comprising a variable displacement metering pump adapted to supply fluid to the servo motor, a multi-position solenoid controlled valve intermediate said member and said pump to direct fluid to a preselected side of said piston, a first electrical relay means adapted to move said valve to one fluid transferring position, a second electrical relay means adapted to move said valve to another fluid transferring position, each of said relays including separate means when energized for rendering the other relay inoperative for actuating said pump, and for actuating said valve, and gauging means for selectively actuating said relays in accordance with the size of the work piece.

10. A feed controlling mechanism for a grinding machine comprising a servo motor having a movable piston to effect a feeding operation, an hydraulic system for operating the motor and including an adjustable metering pump for delivering fluid under predetermined pressure to said motor, a solenoid operated reversing valve which selectively directs fluid from the pump to the desired side of the piston to control piston movement in preselected opposite directions, gauging means responsive to the size of a work piece, said gauging means being located out of contact with the work piece during a gauging operation, switching mechanism responsive to the gauging means and controlling the solenoid operated reversing valve, a manually operable reversing valve controlling the piston movement independently of the solenoid operated valve, and locking means automatically securing one reversing valve in a neutral inoperative position when the other reversing valve is being operated.

References Cited in the file of this patent

UNITED STATES PATENTS

| | | |
|---|---|---|
| 1,733,098 | Kern | Oct. 22, 1929 |
| 2,199,457 | Haas | May 7, 1940 |
| 2,295,342 | Graf et al. | Sept. 8, 1942 |
| 2,478,562 | Binns et al. | Aug. 9, 1949 |
| 2,638,719 | Balsiger et al. | May 19, 1953 |
| 2,761,253 | Barhorst | Sept. 4, 1956 |